J. J. TIERNEY.
WHEEL RIM.
APPLICATION FILED APR. 29, 1918.

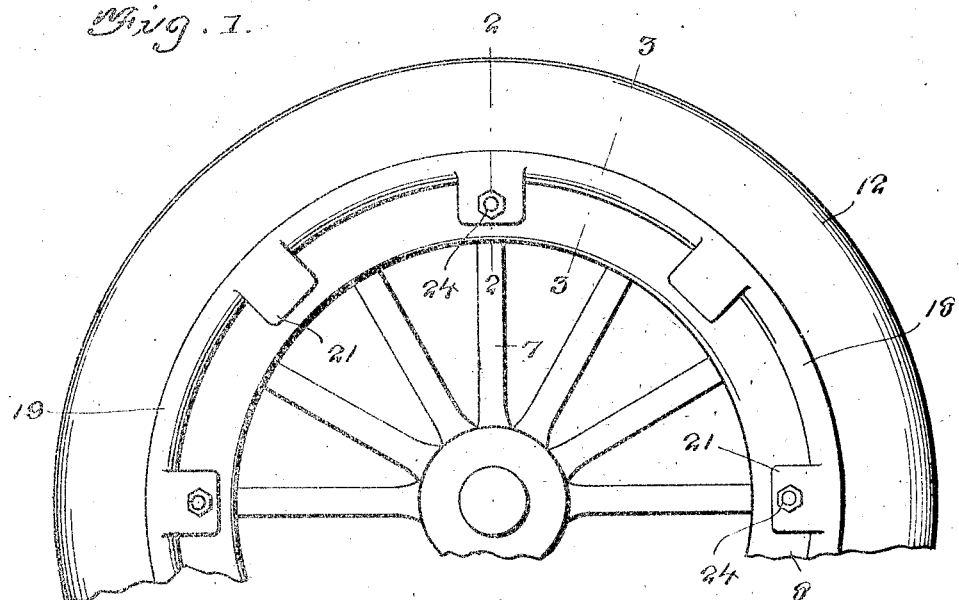
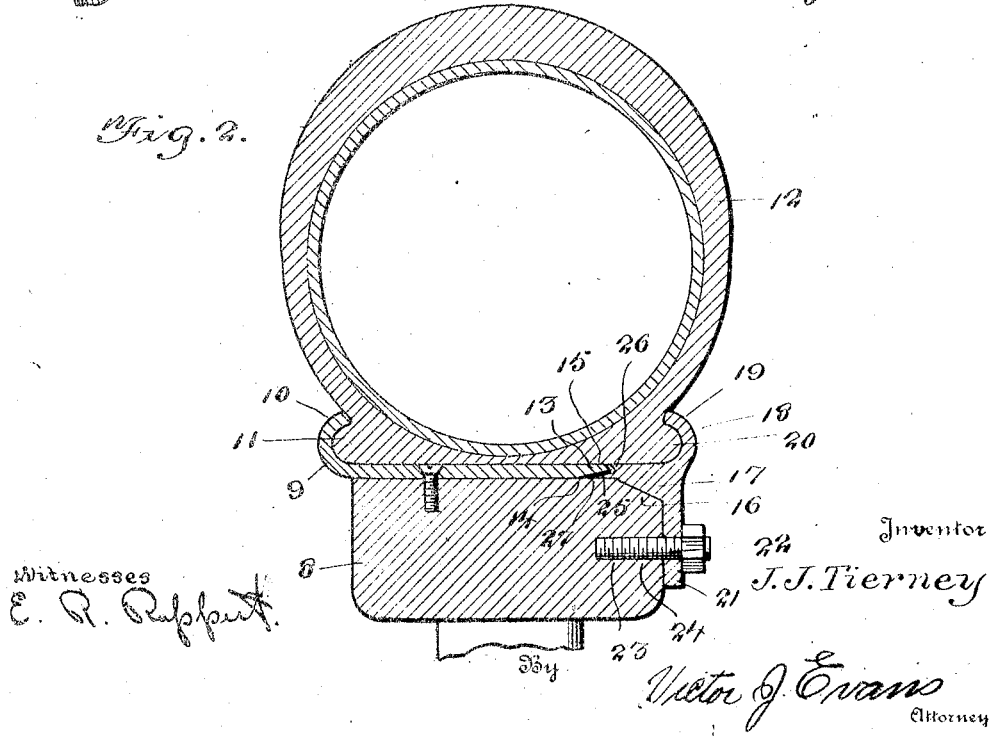

1,369,575.

Patented Feb. 22, 1921.
2 SHEETS—SHEET 2.

Inventor
J. J. Tierney

Witnesses
E. Q. Ruppert

By Victor J. Evans
Attorney

UNITED STATES PATENT OFFICE.

JACK J. TIERNEY, OF ST. ALBANS, WEST VIRGINIA, ASSIGNOR OF ONE-HALF TO JAMES PRICE WARRICK, OF ST. ALBANS, WEST VIRGINIA.

WHEEL-RIM.

1,369,575.  Specification of Letters Patent.  Patented Feb. 22, 1921.

Application filed April 29, 1918. Serial No. 231,435.

*To all whom it may concern:*

Be it known that I, JACK J. TIERNEY, a citizen of the United States, residing at St. Albans, in the county of Kanawha and State of West Virginia, have invented new and useful Improvements in Wheel-Rims, of which the following is a specification.

This invention relates to tire carrying rims for vehicle wheels, and has for its object to produce a rim for this purpose including a rigid and a detachable member, the latter so engaging with the former and with the felly of the wheel as to permit of a quick attachment and detachment thereof and also to hold the said detachable member against turning by means other than that employed for securing the said member on the felly.

Other objects and advantages will appear as the nature of the invention is better understood, reference being had to the accompanying drawings, in which, Figure 1 is a view of a vehicle wheel illustrating the application of the improvement.

Fig. 2 is a greatly enlarged sectional view approximately on the line 2—2 of Fig. 1.

Figure 3:
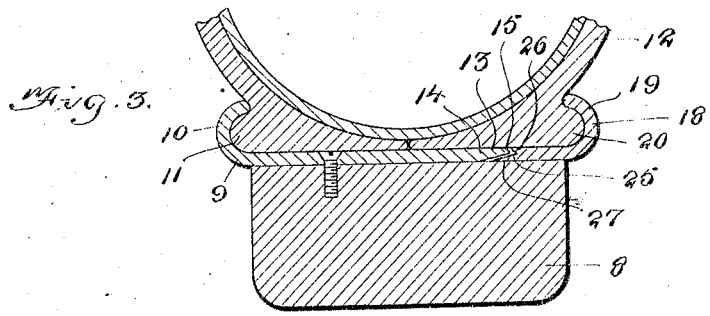
Fig. 3 is a similar sectional view approximately on the line 3—3 of Fig. 1.
Figure 4:
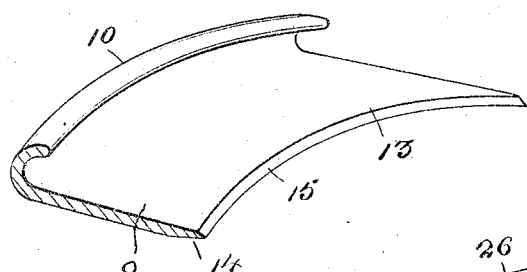
Fig. 4 is a detail perspective view of a portion of the rigid member of the rim.
Figure 5:
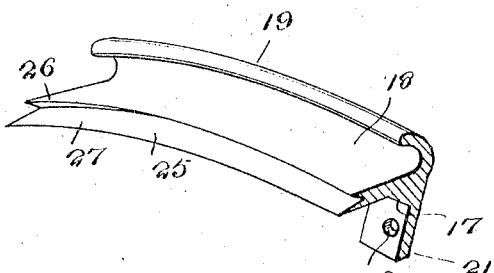
Fig. 5 is a similar view of a portion of the detachable member of the rim, looking toward the inner face thereof.
Figure 6:
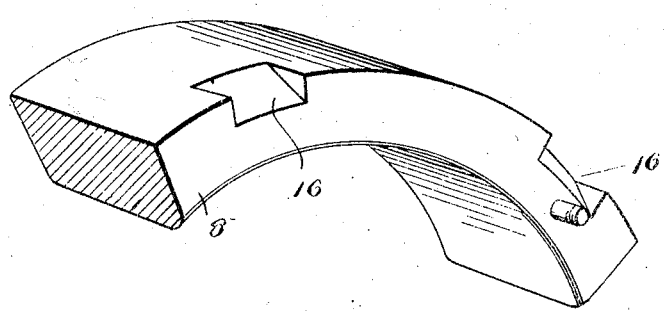
Fig. 6 is a perspective view of a portion of the wheel felly.

In the drawings the vehicle wheel is indicated by the numeral 7 and has secured to the felly 8 thereof one of the members 9 of my improved rim. The member 9 has its outer edge formed with a continuous inturned lip 10 designed to engage with one of the beads 11 on the pneumatic tire 12. The inner edge of the member 9 terminates a suitable distance from one of the sides of the felly 8 and has this edge beveled in opposite directions to provide a continuous tongue 13. The under wall 14 of the tongue 13 is of a greater length than the outer wall 15 thereof.

The felly 8, at the corner thereof adjacent to the tongue 13 is provided with spaced notches 16, the inner walls of which are arranged at an inward and upward angle. These notches are designed to receive angular lugs 17 formed on the inner face and adjacent to the outer edge of the removable section 18 of the rim. The section 18 has its outer edge provided with a continuous inturned lip 19 designed to engage with the second bead 20 on the pneumatic tire 12. The rim section 18 outward and opposite each of the lugs 17 is provided with inwardly extending radially disposed ears 21, each alternating ear has an opening 22 therethrough that is adapted to register with the threaded opening 23 in the felly 8; screwed in the openings 23 are bolts 24 that pass through the openings 23 in the ears provided with said openings. These bolts are engaged by nuts 25 that contact with the said ears.

The section 18, upon its inner edge is provided with a continuous groove 25, defining oppositely beveled or inclined walls 26 and 27 respectively, the lower wall 26 being of greater length than the upper wall 27. The groove 25 is designed to receive the tongue 13 of the section 9 when the removable section 18 is arranged on the felly, and when the sections of the rim are assembled an outer smooth face will be provided for seating the tire 12. It will be apparent that by adjusting the nuts 25 the section 18 may be brought toward the section 9 to firmly clench the tire between the sections.

Having thus described the invention, what I claim is:

A vehicle wheel and a tire carrying rim therefor, said wheel having its felly on one side thereof formed with V-shaped notches at the outer edge thereof and having spaced outstanding threaded members on the side provided with the notches, the tire carrying rim including a fixed section and a removable section, the base of the fixed section being of a materially greater width than that of the removable section and having the inner edge thereof formed with an angle tongue, the base of the removable section having an angle groove to receive the angle tongue of the base of the fixed section, said removable section having its base, at equidistantly spaced intervals formed with angle elements that are designed to be received in the notches of the felly and having depending ears, certain of which having openings therethrough for the reception of threaded elements that are carried by the felly and nuts engaging said elements and contacting with said nuts.

In testimony whereof I affix my signature.

JACK J. TIERNEY.